Figure 1:
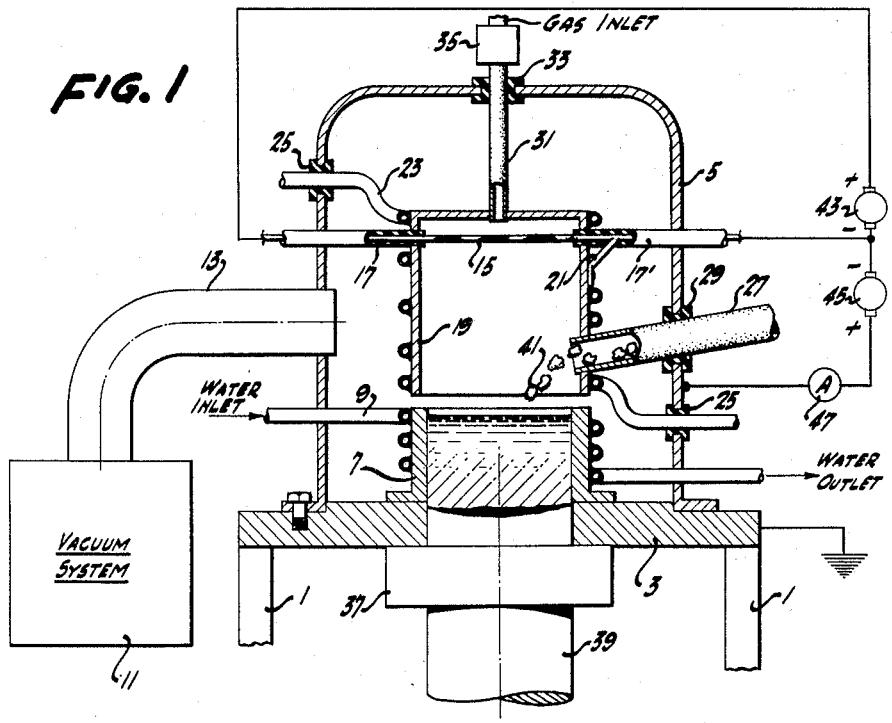

May 3, 1960 H. R. SMITH, JR 2,935,395
HIGH VACUUM METALLURGICAL APPARATUS AND METHOD
Filed Feb. 21, 1955

INVENTOR.
HUGH R. SMITH, JR.
BY
Lippincott + Smith
ATTORNEYS

United States Patent Office 2,935,395
Patented May 3, 1960

2,935,395

HIGH VACUUM METALLURGICAL APPARATUS AND METHOD

Hugh R. Smith, Jr., Berkeley, Calif., assignor, by mesne assignments, to Stauffer Chemical Company, New York, N.Y., a corporation of Delaware Application February 21, 1955, Serial No. 489,333

9 Claims. (Cl. 75—10)

This invention relates to the melting and casting of conductive materials in vacuo. While the invention is particularly adapted to the processing of materials of high melting point, those which are extremely active chemically, or those which are most readily available in non-homogeneous form, such as sponges, granules or powders, and the like, its usefulness is by no means limited to materials of these classes.

Vacuum melting of conductive materials has, in the past, usually been accomplished in one of two ways: where high vacuum has been necessary, induction heating has most frequently been used, the energy to melt the material being supplied to it by currents, usually of high frequency, induced in the material electromagnetically. Where a lower vacuum is satisfactory, arc heating may be used.

With certain classes of materials neither of these expedients is satisfactory. This is particularly true in the case of the amorphous powders. Certain processes for the production of zirconium or titanium for example, yield the material in this form. Such a powder will readily pass a screen of 100 mesh, or even finer. The resistance of a mass of such material is so great that it is practically impossible to establish circulating currents in it, by induction, of sufficient magnitude to melt it, and furthermore, if it is melted it vigorously attacks any container which holds or attempts to hold it. If it be attempted to melt it by means of the electric arc the gas pressure necessary to sustain the arc is high enough so that the violent convection currents set up by the high temperature within the arc itself agitate and carry away the fine particles. Other materials may dissolve or combine with any atmosphere which it may be convenient to supply to maintain the arc, even though they may not be supplied normally in powder form.

Moreover, where arcs are used, it may be difficult to control the point at which the arc strikes. Various methods have been used in the past to keep the arc moving over the surface of a melt, but these methods have usually involved some complication and have not always been satisfactory. Materials which are available in sponge form, although not so difficult to handle as the powders, suffer from much the same limitations with respect to induction heating and while they are not affected by convection currents, are subject to all the limitations which may be due to their chemical activity, either with respect to the container or to the gases in which they are melted.

The present invention is not limited to use in connection with materials which cannot be handled by conventional methods. While its primary field of use is in connection with material exhibiting one or more of the properties which have been discussed above, it is also useful in connection with the more familiar metals of high melting point, such as cobalt and nickel, and may also have advantages in the melting, casting, or evaporating of metals of lower melting points.

Among the objects of the present invention, therefore, are these to provide means and methods for melting materials having a high degree of chemical activity; to provide means and methods for melting high-resistance, non-massive materials in vacua which may be as high as or higher than one-half micron of mercury absolute pressure; to provide apparatus for melting conductive materials wherein the area within which the heat is applied is accurately delimited, and wherein the heating within such area is practically uniform; to provide means and methods which are applicable to either batch or continuous processes of treatment; to provide means and methods of accomplishing the functions enumerated above which are capable of treating materials on a tonnage basis, as distinguished from laboratory operations, wherein the daily output is of the order of pounds or possibly hundreds of pounds; to provide means and methods of metallurgical treatment which not only prevent contamination of the melt by materials introduced in the process but which are also capable of removing gases which may have been dissolved in the material during prior operations and wherein the release of such gases does not interfere with the melting, casting, or other treatment which is being carried forward; and to provide apparatus for the purposes described which is simple in construction and economical in operation.

In general terms, the present invention involves the use of an evacuable enclosure provided with a port or ports adapted for connection to a vacuum pump of sufficient capacity to maintain high vacuum conditions (of the order of 1 micron of mercury or less) within the enclosure, even if the material to be melted contains dissolved or absorbed gas which may be liberated during the melting process. Mounted in the bottom of the enclosure is a conductive receptacle for the material to be melted. Preferably this receptacle is of a material of high thermal conductivity and reasonably high melting point, such as copper, and is water cooled, provision preferably being made for continuous circulation of cooling water or other liquid through or around it. Mounted above this receptacle is an electron-emissive cathode of the thermo-emissive type, either directly heated, as, for example, a cathode formed of tungsten rod or wire, or which may be indirectly heated by radiation, bombardment, or conduction. Connections are provided for applying to the receptacle a potential positive to the cathode; as a practical matter, the receptacle and enclosure are preferably arranged for operation at ground potential, the cathode being supplied by insulated lead-ins through the wall of the enclosure, so that the receptacle and any conductive material contained therein becomes, in effect, an anode which is bombarded by the discharge originating at the cathode. Associated with the discharge electrodes are means for focusing the electrons upon the area within the anode receptacle rather than the wall thereof. The focusing means may be constituted by the conformation of the cathode itself, but preferably comprise a barrier surrounding a portion of the electron path between cathode and anode, this barrier being operated at a potential which is the same as or negative to the cathode and forming, with the other electrodes of the system, a converging electron lens the characteristics of which are adjustable by varying the potential of the barrier or its geometry, so that the area of impact of the beam within the receptacle may be made to conform substantially to the internal area of the receptacle. Where continuous operation is desired there are provided means for feeding the material to be melted into the receptacle and means for continuously withdrawing the material from the receptacle. In such cases the latter may be a bottomless annulus located over an orifice at the bottom of the enclosure. Beneath the orifice there will then be located a vacuum-seal, adapted to pass and seal a rod or ingot having practically the internal dimension of the receptacle, such rod, when inserted, becoming in effect the bottom of the receptacle. The invention also includes means for introducing within the barrier, and adjacent to the electron path, a controlled flow of gas.

In operation the material to be melted, e.g., titanium powder, is fed in a continuous stream into a receptacle, the bottom of the latter being sealed either by an ingot formed in a preceding operation, or by a conductive rod introduced solely for the purpose. The necessary potentials are applied to the electrodes to develop an electron stream which bombards the material to be treated, the electrons giving up their energy and thus providing that required to melt the material. The apparatus is pumped continuously, not only to remove any gas leaking in through the seals, but also any which may be liberated from the material as it melts and that introduced within the barrier. The vacuum is maintained in the neighborhood of one micron of mercury or less in the body of the enclosure. Usually it is advisable to introduce continuously a very small quantity of gas in the vicinity of the electron stream, so that within the barrier the pressure is higher by one or more orders of magnitude. The result of this procedure is to change the pure electron flow from the cathode into a glow discharge (meaning a luminous discharge—not a cold-cathode glow discharge), which is not permitted to degenerate into an arc; the nature of the discharge is controllable to a considerable extent by regulation of the flow of gas. The glow discharge indicates the formation of a cloud of ions which reduces greatly the potential required to cause a given flow of current to the melt. The cathode should be so designed as to provide an extremely liberal supply of electrons, sufficient for a fairly large discharge current; one effect of the ionized gas constituting the glow discharge is to neutralize the electron space charge and thus permit increase of the space current through the presence of positive ions. A second but relatively minor effect is that the electrons released in the ionization act as additional carriers which bombard the melt. Bombardment of the cathode by the resulting positive ions is limited by several factors; their relatively large mass and consequent slow acceleration toward the cathode results in their carrying a relatively small portion of the space current in any event. Some are attracted to the barrier and will eventually reach it, e.g. if they are liberated where the field toward it is stronger than that toward the cathode. Some cathode bombardment does exist, however, which heats the cathode. The amount of such heating can be controlled by regulation of the gas admitted within the barrier, and hence, under certain conditions, independent cathode heating can be discontinued after the initial phase of the operation.

One of the most important features of the invention is that the glow discharge does not extend beyond the barrier into the body of the enclosure. Even within the barrier the pressure is so low and the mean free path between gas particles is so long that collisions between the particles are rare. They escape into the body of the container. After they have so escaped the mean free path becomes so long that further ionization by collision does not occur, and such ions as have not recombined are pumped out together with the un-ionized molecules.

Owing to the thermal conductivity of the material under treatment, that in the center of the receptacle will melt first. That at the edges, when it does melt, comes into more intimate contact with the cold walls of the receptacle and chills, solidifying and shrinking toward the center of the melt as soon as it touches the water-cooled sides of the receptacle, whereas that at the bottom will fuse to the rod which plugs the receptacle. The rod is then gradually and continuously withdrawn, as rapidly as the material fed into the receptacle melts. This can be cut into lengths as desired as it emerges.

Figure 2:
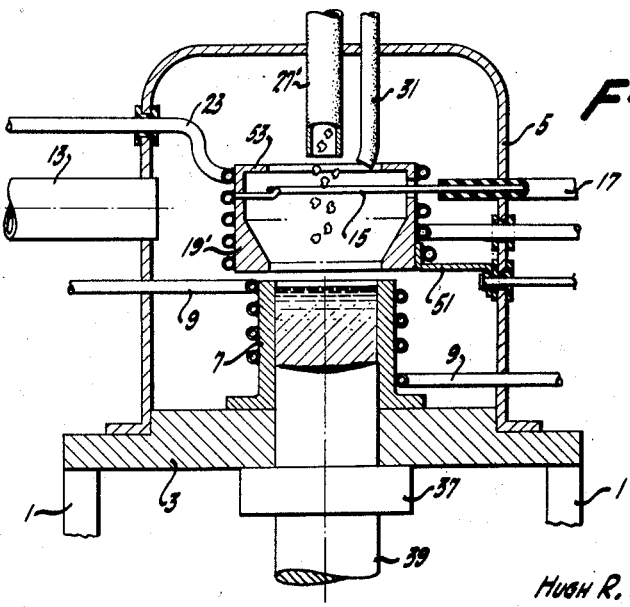

In the drawings, in connection with which the invention will be described in greater detail:

Fig. 1 is a semi-schematic vertical sectional view of an embodiment of the invention as adapted for use with relatively low bombarding potentials; and Fig. 2 is a similar view of the apparatus for use with higher potentials.

Considering first the arrangement illustrated in Fig. 1, the apparatus there shown is mounted on a suitable supporting frame 1, far enough above the floor to permit the withdrawal from beneath of the ingots or castings as they are formed. A centrally apertured base-plate 3 is supported by the frame and an evacuable enclosure 5 is mounted on top of the base-plate. This portion of the structure is entirely of metal and is preferably grounded.

The base-plate 3 is provided with a central opening, which is, in this instance, circular. A conductive receptacle or casting mold 7 is secured to the base-plate immediately above the opening. Because of its high conductivity, both thermal and electric, the receptacle is preferably of copper. In form it is an annulus or bottomless cup, having an internal diameter equal to or slightly smaller than the opening in the base-plate. A cooling coil 9 of copper tubing surrounds and is brazed or is otherwise secured to the receptacle 7, its inlet and outlet connections passing through the walls of the enclosure through vacuum-tight joints.

The enclosure 5 is provided with one or more ports adapted for connection with a vacuum system 11, through a suitable duct 13. The port should be large and the vacuum pump or pumps powerful to permit rapid initial evacuation and constant maintenance of high vacuum conditions within the enclosure. Such vacuum systems are well known in the art, and usually consist of a large diffusion pump, backed up by one or more mechanical pumps. Since such arrangements are conventional the system here used is not shown in detail. It should, however, be able to hold the pressure within the enclosure down to one micron of mercury or less.

An electron-emissive cathode 15, preferably of tungsten rod or wire, is mounted above the receptacle and is coiled or convoluted so as to form a relatively large emissive surface. Current for heating the cathode is supplied through the walls of the container by insulated leads 17 and 17'. A metal barrier 19, in the present instance in the form of an inverted cup, surrounds the cathode and a major portion of the space between it and the receptacle, which space, when the device is in operation, will become the path of the discharge between the cathode and the receptacle and its contents, acting as an anode. The insulated leads to the cathode penetrate the sides of the barrier, which is electrically connected to the cathode as, for example, by the conductor 21. Thus the barrier 19 is kept at cathode potential, and together with cathode 15 forms a cathode and focusing structure for directing an electron beam into the open top of receptacle 7. Like the receptacle 7, the barrier is water-cooled. In this case, however, the copper tubing 23 which forms the cooling coil which surrounds and is preferably brazed to the barrier is brought in through the walls of the enclosure through insulating seals 25.

Two ducts are brought into the apparatus through the walls of both the enclosure 5 and the barrier 19. Preferably they are of a refractory insulating material, such as a ceramic. The first duct 27 is relatively large. Through it the materials to be melted can be continuously introduced at a regulated rate. The charge can be supplied in conventional fashion from a hopper within a vacuum lock. Since such arrangements are well known and form no part of the present invention they are not shown. The duct 27 enters the enclosure through a vacuum seal 29.

The second duct 31 enters the top of the container through a seal 33. This duct is of small internal diameter and is for the introduction within the barrier of a small flow of inert gas under low pressure. The gas used will depend upon the material of the melt. With some materials it may be nitrogen, but in general one of the monatomic gases, preferably argon, is used. A suitable valve, schematically indicated at 35, is provided to control the flow of gas.

Externally of the container and immediately below the receptacle 7 there is mounted a vacuum seal 37 of the type usually provided for sealing movable shafts, and the like, which must penetrate evacuated enclosures. The seal is of a size adapted to form a joint with a shaft of the same internal diameter as the receptacle 7.

In starting operation of the equipment a suitable rod or stub 39 is inserted through the seal 37 to form a bottom for the receptacle 7. This rod may be a previously-formed ingot of the material to be melted, or it may simply be a plug of steel or other metal which may later be cut off of the ingot after it is formed. A charge of material filling the receptacle is introduced through the duct 27, as is indicated at 41, and the enclosure is evacuated. As soon as evacuation is substantially complete current is passed through the cathode 15 from a suitable source 43 until it is heated to a temperature high enough so that it emits a copious supply of electrons. Voltage is then applied from some suitable direct-current source, such as a motor-generator 45, between the cathode and the receptacle 7. With the structure shown in Fig. 1 the voltage employed will usually be in the neighborhood of 200 volts or less, the figure of 200 volts being approximately the dividing line between the employment of the type of structure shown in the first figure and that shown in Fig. 2, later to be described. It is to be understood, however, that this is not an absolute value but is merely an indication of a general order of magnitude.

At this point of the operation some discharge will occur between the cathode and the anode formed by the receptacle and the material within it, but this discharge will be capable of carrying relatively little energy. The barrier 19 is at the same potential as one end of the cathode and serves very largely to shield it. A heavy space charge therefore exists within the barrier. Such discharge as does occur is focused on the charge within the receptacle by the field between the edges of the barrier and the material within the receptacle.

A small flow of gas is then admitted within the barrier through the valve 35 and duct 31. The gas so admitted immediately becomes ionized, establishing a glow discharge between the cathode and the anode formed by the charge within the receptacle.

The nature of the discharge can be controlled accurately by the amount of gas admitted. If too much is allowed to enter an arc will form, concentrating the discharge in a relatively small area of the anode surface. The gas flow is so restricted as to prevent this. When the proper pressure is established a cloud of ions fills the space within the barrier, distributing the discharge over the entire surface of the charge. The nature of the discharge can be quite accurately determined by the current flow, as indicated by ammeter 47 in the circuit. The discharge automatically limits itself to the melt within the receptacle, and there is practically no discharge to the receptacle walls. This is probably due to a higher vapor density above the molten material and a larger supply of gas particles to be ionized available in this area. There is also a steep pressure gradient through the gap between the receptacle and the barrier. At all events the limitation occurs.

Although a definite gas atmosphere exists within the barrier the pressure within it is still very low. The escape of the gas molecules from within the barrier into the body of the enclosure is therefore somewhat more like a diffusion phenomenon than a regular fluid flow. Once having escaped from the barrier into the relatively large body of the enclosure outside, the mean free path of the molecules becomes too great to permit the type of ionization by collision which occurs inside the barrier and no glow discharge occurs outside; the molecules which escape are removed by the vacuum system at the same rate as they are admitted. In the absence of the barrier the glow discharge would either fill the entire enclosure and the energy would be generally dissipated instead of being concentrated upon the melt, or no gas discharge would occur. If too much gas is admitted, or the vacuum system fails, general ionization does occur, the glow discharge following the cathode leads first and then extending from the exterior of the barrier to the walls of the enclosure.

The major portion of the current carriers within the discharge are still electrons. The positive ions produced within the cloud are many times heavier than the electrons; they are, of course, attracted both to the cathode and to the barrier walls. In general, they carry equal but opposite charges to the electrons, but because of their much greater mass they accelerate relatively slowly. Where they strike the barrier the heat generated by their impact is carried away by the cooling system. The cathode 15 is not so cooled. Therefore, after the discharge is established at its desired value, supply of current from the source 43 can be reduced or discontinued entirely, the emitting temperature of the cathode being maintained by positive-ion bombardment. If too heavy a discharge is maintained within the barrier the positive-ion bombardment may be sufficient to overheat the cathode and cause it to fail in a shorter time than the approximately 2000 hours which may be expected as the normal life. As has already been indicated, the discharge current, for given applied voltage between cathode and anode, can be regulated by controlling the flow of inert gas which is admitted into the barrier. One criterion for the intensity of discharge is the heating of the cathode. In general about 10% of the total power expended in this system will be required for this purpose in any event. Thus, in a small pilot unit employing a 6 kw. discharge, about 600 watts is employed to heat the cathode, whether this wattage be supplied by the source 43 or by positive ion bombardment.

When the discharge is first established to the unconsolidated particles to be melted, thermal conduction between them is relatively slight, and those at the top of the charge within the receptacle quickly melt, running down to the bottom of the receptacle and flowing out toward the walls. Striking the cooled walls of the receptacle, the molten material immediately solidifies and a temperature gradient establishes itself from the center out toward the edges of the melt. At the bottom of the melt, molten material solidifies and fuses to the stub 39. The material shrinks as it solidifies, pulling away from the walls of the receptacle to some extent as it does so. Once the operation has started, a pool of molten metal fills the upper part of receptacle 7, as shown in the drawings. This pool is maintained by the electron-bombardment heating of its upper surface to a temperature above the melting point, and the continual supply of raw material into the pool through duct 27. At the bottom of the pool, material continuously solidifies and fuses to the top of the ingot, and the ingot is continuously withdrawn so as to remove material through the bottom of the receptacle as fast as it is fed into the top through the duct 27. As it emerges the ingot can be cut off from time to time in sections of the required length.

The embodiment of the invention illustrated in Fig. 2 is in general similar to that shown in Fig. 1, insofar as the enclosure itself, the receptacle and the vacuum system are concerned. The parts which exercise the same functions, in general, are indicated by the same reference characters, distinguished by accents where there is a difference in function or a significant difference in structure.

The apparatus of Fig. 2 is adapted for use with higher voltages between cathode and anode and lower current for a given power input. The principal difference between the structure of Fig. 2 and that of Fig. 1 lies in the barrier 19'. As in the case of Fig. 1, the barrier is water-cooled, but this is not always necessary, and the barrier is therefore shown as being supported on brackets 51 as well as by the cooling pipes 23. As shown, however, at one point the tungsten-rod cathode is connected to the barrier. The two terminals are brought out through openings in the wall of the barrier. They are connected through the wall of the enclosure 5 by insulated leads 17 as before. In this case the barrier 19' is open at the top, and together with the loop cathode 15 forms a generally cylindrical cathode and focusing structure defining and surrounding an unobstructed vertical passage between the open top of receptacle 7 and the evacuated enclosure as a whole; hence the duct 27' can drop the material to be melted directly through the aperture or vertical passage through the cathode and focusing structure into the receptacle. As in the first showing, the duct 31 also enters through the top of the enclosure to discharge gas into the electron stream.

Because of the open nature of the barrier 19' the pressure difference between its interior and the body of the enclosure is very much lower than in the first form. The pressure inside the barrier can, however, be made high enough to support a luminous discharge, but owing to the very much reduced number of ionic carriers a much higher voltage can be maintained between the cathode and the anode. The form of the invention shown in Fig. 2 is therefore a high-voltage, low-current device as compared with that of Fig. 1. Each arrangement has certain advantages. The insulation problem is simpler in the form of apparatus shown in Fig. 1. That shown in Fig. 2 requires less emission from the cathode for equal power and therefore the over-all efficiency is somewhat higher. It will be obvious that in the construction shown in Fig. 2 there is a field existing between the cathode 15 and the upper wall of the container, and it might be expected that a discharge would occur along this field. This does not happen for a number of reasons: for example, the cathode is disposed as a loop, near the periphery of the barrier, and is partly shielded by the flange 53 which partially encloses the top of the barrier structure. Most of the lines of force from the upper portion of the enclosure therefore terminate on this flange, so that the field which terminates at the cathode itself is relatively weak.

Outside of this flange the pressure is too low to support a glow discharge, the pressure at the central orifice being substantially as low as that within the body of the container. The highest pressure within the barrier is somewhere below the cathode, between it and the anode. In this region the gas is ionized, the space charge is largely neutralized, and the discharge occurring acts so effectively to short-circuit other paths between the cathode and the enclosure that discharge along the stray paths is negligible. The highest pressure is probably immediately above the center of the melt, where there are ionized molecules of vapor from it as well as ionized injected gas. As in the case of the lower-voltage discharge, the result is something in the nature of "gas focusing" which limits the discharge to the surface of the melt, practically no space current flowing to the walls of the receptacle 7. The operations, as far as the handling of the melt and the withdrawal of the ingot are concerned, are identical with those of the apparatus illustrated in the first figure.

In both cases the nature of the discharge is to be sharply distinguished from an arc. The latter type of discharge is characterized by a definite core of ionized and highly conductive gas and the discharge terminates in a single spot on the surface of the anode, and similarly on the cathode. It is well known that an arc has a negative-resistance characteristic; i.e., once an arc has been started, the current increases until equilibrium is established, if at all, usually through limitation of the current by resistance in the supply circuit external to the arc itself. The type of discharge used in the present system is completely diffuse. The current in the discharge is a direct function of the gas pressure over a considerable operating range.

It is possible to operate either form of apparatus shown at low melting rates with a pure thermionic discharge between the cathode and the melt; all that is necessary to accomplish this is to reduce the density of gaseous matter within the barrier sufficiently, e.g., by cutting off the flow of gas entirely. This requires that a much higher voltage be used across the discharge than where gas is injected. The modification shown in Fig. 2 is more suited to this type of operation than that of Fig. 1; the separation between cathode and anode is less and the cathode is less effectively shielded, so that more lines of force terminate on the cathode and a higher voltage gradient develops. If, with the apparatus of Fig. 2, the flow of injected gas is gradually cut off, while the melting rate is kept low enough that gases evolved from the melt are insignificant, the "gas focusing" effect becomes less and less and the shape of the barrier becomes more important since the field in the gap between it and the receptacle determine the character of the electron lens and the area, within which the discharge impacts the melt. The inwardly sloping walls within the barrier, as shown in Fig. 2, which serve to determine, in part, the shape of the field, are more necessary at higher vacua than they are at lower ones. At the low-vacuum end of the range, where a considerable amount of gas is introduced into the open-topped barrier, the walls may be cylindrical, as they are in the closed type of barrier.

The receptacle 7 here used is not a crucible in the ordinary sense, since heat is not supplied to the melt through it, nor does molten material ever remain in contact with it. Actually the molten material is retained within a vessel of the same substance in solid phase. The melt, therefore, is never contaminated by material dissolved from the walls of its container. It should be obvious, moreover, that by reducing the circulation of the coolant in the coil 9 throughout the receptacle, so that the melt solidifies only in a layer around the periphery a discharge port can be formed of the material itself and it can be withdrawn in liquid phase, to be cast in other than the ingot form shown.

Even with the low-voltage type of operation described in connection with Fig. 1, the average gas pressure within the barrier may be lower than that ordinarily associated with an arc; and also may be lower than the vapor pressures ordinarily developed due to release of dissolved or occluded gas. With arc operation contamination from the atmosphere surrounding the arc may result, as well as the disturbance due to convection currents which prohibits the use of arc-melting of amorphous powders. Therefore, while the pressures employed are intermediate those of past practice, the type of discharge employed is quite different, not merely in degree but in kind.

Many modifications of the form of cathode, barrier, and receptacles are possible. The barrier serves the double purpose of confining the region of higher pressure and of acting as a focusing electrode, and its shape can therefore be modified greatly to change the size, shape and relative concentration of the discharge. The specific form of apparatus shown is therefore not intended to indicate limitations upon the scope of the invention, all intended limitations being specifically expressed in the following claims.

I claim:

1. Apparatus for melting conductive materials in vacuo comprising an evacuable enclosure having a port therein adapted for connection to a vacuum pump, a conductive receptable positioned within said enclosure a thermionic cathode mounted within said enclosure, above said receptacle, leads for supplying electrical energy to said cathode extending through the wall of said enclosure, a barrier within said enclosure surrounding a major portion of the path between said cathode and said receptacle, the space within said barrier communicating with that within the enclosure as a whole, means for feeding material to be melted into said receptacle, and connections for applying a positive voltage with respect to said cathode to said receptacle.

2. Apparatus for melting conductive materials in vacuo comprising an evacuable enclosure having a port therein adapted for connection to a vacuum pump, a conductive receptacle positioned within said enclosure, a thermionic cathode mounted within said enclosure above said receptacle a barrier surrounding the space between said cathode and said receptacle, leads for supplying electrical energy to said cathode extending through the wall of said enclosure, means for admitting a controlled flow of gas into said enclosure at a location adjacent to the path between said cathode and said receptacle, means for feeding material to be melted into said receptacle and connections for applying a positive voltage with respect to said cathode to said receptacle.

3. Apparatus for melting conductive materials in vacuo comprising an evacuable enclosure having a port therein adapted for connection to a vacuum pump, a conductive receptacle positioned within said enclosure, a thermionic cathode mounted within said enclosure above said receptacle, leads for supplying electrical energy to said cathode extending through the wall of said enclosure, a barrier within said enclosure surrounding a major portion of the path between said cathode and said receptacle, the space within said barrier communicating with that within the body of said enclosure, means for admitting a controlled flow of gas into the space within said barrier, means for feeding material to be melted into said receptacle and connections for applying a positive voltage with respect to said cathode to said receptacle.

4. The method of melting materials in vacuo which comprises the steps of establishing an electric field directed upon the material to be melted as an anode, maintaining within said field an electron charge of such density that the flow of electrons therefrom to said material is limited by the space charge produced by the electrons, admitting a controlled flow of gas into the region occupied by said field, exhausting the region surrounding that occupied by said field, and coordinating the rates of gas admission and exhaust to maintain a maximum pressure of 1 micron of mercury in said surrounding region and a pressure at least an order of magnitude greater in the region occupied by said field, whereby a glow discharge is established to said material to be melted while the pressure in said surrounding region is too low to maintain a glow discharge.

5. In apparatus for heating electrically conductive material in vacuo, the combination of a high-vacuum enclosure, means to evacuate said enclosure, supporting means for said conductive material within said enclosure, a thermionically electron-emissive cathode within said enclosure, connections for supplying electrical heating current to said cathode, connections for establishing said material at a positive electric potential relative to said cathode, whereby an essentially electronic discharge from said cathode bombards and heats said material, and a generally cylindrical barrier within said enclosure coaxial with and surrounding a major portion of said discharge, said barrier being physically spaced and electrically insulated from both said enclosure and the bombarded material, the space within said barrier communicating with and being small in relation to the surrounding space within the enclosure as a whole.

6. In apparatus for heating electrically conductive, molten material in vacuo, the combination of a high-vacuum enclosure, means for continuously evacuating the space within said enclosure, a receptacle for said molten material, said receptacle having a top opening into said evacuated space, a generally cylindrical electron-emissive cathode and focusing structure disposed within said enclosure above and in vertical axial alinement with said receptacle for bombarding said material with electrons, said cathode and focusing structure being open at both ends and defining a substantially unobstructed vertical passage between the top of said receptacle and the evacuated space within said enclosure as a whole.

7. In apparatus for melting and casting material in vacuo, the combination of a high-vacuum enclosure, means for continuously evacuating said enclosure, an annular mold, open at both ends, disposed with its axis vertical and its upper end opening into said enclosure, means for continuously cooling said mold for solidifying molten material therein, whereby a continuous rod of solidified cast material can be withdrawn progressively from the lower end of said mold, an annular cathode disposed horizontally within said enclosure and in vertical alinement with said mold for bombarding the material therein with electrons to maintain a molten pool of said material at the upper end of said mold, a focusing electrode, physically spaced and electrically insulated from both the enclosure and the mold, coaxially surrounding said cathode and shaped to direct the electrons emitted thereby inwardly and downwardly into the open upper end of said mold, said cathode and focusing electrode together forming a structure open at both ends and defining a vertical passage leading into the top of said mold, and means for continually supplying said material downward through said passage into said molten pool.

8. In apparatus for heating electrically conductive material in vacuo, the combination of high-vacuum enclosure, means to evacuate said enclosure, supporting means for said conductive material within said enclosure, a thermionically electron-emissive cathode within said enclosure, connections for supplying electrical heating current to said cathode, connections for establishing said material at a positive electric potential relative to said cathode, whereby an essentially electronic discharge from said cathode bombards and heats said material, and a generally cylindrical barrier within said enclosure coaxial with and surrounding a major portion of said discharge, the space within said barrier communicating with and being small in relation to the surrounding space within the enclosure as a whole, said barrier being an electrically conductive cylinder having one closed end and one open end, said open end being adjacent to and yet spaced from the bombarded material so that a passage for gaseous material is defined therebetween, said cathode being disposed within said barrier adjacent to the closed end thereof.

9. In apparatus for heating electrically conductive material in vacuo, the combination of a high vacuum enclosure, means to evacuate said enclosure, supporting means for said conductive material within said enclosure, a thermionically electron-emissive cathode within said enclosure, connections for supplying electrical heating current to said cathode, connections for establishing said material at a positive electric potential relative to said cathode, whereby an essentially electronic discharge from said cathode bombards and heats said material, and a generally cylindrical barrier within said enclosure coaxial with and surrounding a major portion of said discharge, the space within said barrier communicating with and being small in relation to the surrounding space within the enclosure as a whole, said barrier being an electrically conductive cylinder having an opening of reduced diameter at each end, one of said openings being adjacent to and in alinement with the bombarded material, and said cathode being a filamentary loop disposed within and coaxial with said barrier.

References Cited in the file of this patent

UNITED STATES PATENTS

| | | |
|---|---|---|
| 1,374,679 | Pratt | Apr. 12, 1921 |
| 2,266,735 | Berghaus et al. | Dec. 23, 1941 |
| 2,371,278 | Berghaus et al. | Mar. 13, 1945 |
| 2,423,729 | Ruhle | July 8, 1947 |
| 2,554,902 | Godley | May 29, 1951 |
| 2,640,860 | Herres | June 2, 1953 |
| 2,709,842 | Findlay | June 7, 1955 |

FOREIGN PATENTS

| | | |
|---|---|---|
| 427,623 | Great Britain | Apr. 23, 1935 |

OTHER REFERENCES

"Physical Review," volume 55, April 15, 1939, pages 769–775.

Transactions of the Electro Chemical Society, volume 96, No. 3, September 1949, pages 158–169.